(12) United States Patent
Le Saint et al.

(10) Patent No.: US 8,014,570 B2
(45) Date of Patent: Sep. 6, 2011

(54) METHOD FOR IMPROVING FALSE ACCEPTANCE RATE DISCRIMINATING FOR BIOMETRIC AUTHENTICATION SYSTEMS

(75) Inventors: Eric F. Le Saint, Los Altos, CA (US);
Wu Wen, Sunnyvale, CA (US);
Laurence Hamid, Ottawa, CA (US)

(73) Assignee: ActivCard, Inc., Fremont, CA (US)

( * ) Notice: Subject to any disclaimer, the term of this patent is extended or adjusted under 35 U.S.C. 154(b) by 1633 days.

(21) Appl. No.: 11/270,831

(22) Filed: Nov. 10, 2005

(65) Prior Publication Data
US 2006/0104486 A1  May 18, 2006

Related U.S. Application Data

(60) Provisional application No. 60/627,969, filed on Nov. 16, 2004.

(51) Int. Cl.
*G06K 9/00* (2006.01)
(52) U.S. Cl. ....... 382/115; 382/124; 340/5.82; 340/5.83
(58) Field of Classification Search .......... 382/115–127; 340/5.52, 5.53, 5.82, 5.83
See application file for complete search history.

(56) References Cited

U.S. PATENT DOCUMENTS

| | | | |
|---|---|---|---|
| 5,621,809 | A | 4/1997 | Bellegarda et al. |
| 5,815,252 | A | 9/1998 | Price-Francis |
| 6,038,334 | A | 3/2000 | Hamid |
| 6,072,891 | A | 6/2000 | Hamid et al. |
| 6,393,139 | B1 | 5/2002 | Lin et al. |
| 7,734,066 | B2 * | 6/2010 | DeLia et al. .................. 382/115 |
| 2002/0126881 | A1 | 9/2002 | Langley |
| 2003/0103658 | A1 * | 6/2003 | Pan et al. ...................... 382/124 |
| 2004/0042642 | A1 * | 3/2004 | Bolle et al. .................... 382/115 |
| 2004/0123152 | A1 | 6/2004 | Le Saint |

(Continued)

FOREIGN PATENT DOCUMENTS

EP  1431862  6/2004

(Continued)

OTHER PUBLICATIONS

International Search Report dated Feb. 8, 2006 with Written Opinion.

(Continued)

*Primary Examiner* — Jon Chang
(74) *Attorney, Agent, or Firm* — Muirhead and Saturnelli, LLC

(57) ABSTRACT

A method, system and computer program product for improving error discrimination in biometric authentication systems. The error discrimination is set to a predetermined security policy. A plurality of biometric samples are provided and authenticated by a computer system in conjunction with a security token. An alternate embodiment allows inputting of the plurality of biometric samples in a predetermined sequence. The predetermined input sequence is maintained as an authentication secret which may be used to further reduce the authentication transaction error rate. A user may input one or more biometric samples, where a portion of the biometric samples are inputted in a predetermined sequence, selecting from among a plurality of available processing units, a set of processing units which will generate intermediate results from the processing of the biometric samples, processing at least a portion of the biometric samples by the selected set of processing units to provide intermediate results, verifying the predetermined sequence, and arbitrating the intermediate results to generate a final result which at least meets a predetermined security policy. Various embodiments provide for a security token to perform at least a portion of the processing or the arbitration function.

29 Claims, 11 Drawing Sheets

U.S. PATENT DOCUMENTS

2004/0221174 A1   11/2004   Le Saint et al.

FOREIGN PATENT DOCUMENTS

| JP | 816788 | 1/1996 |
|---|---|---|
| WO | 03/062968 | 7/2003 |

OTHER PUBLICATIONS

A. Ross, et al.: "Information Fusion in Biometrics", Pattern Recognition Letter, North-Holland Publ. Amsterdam, NL, vol. 24, No. 13, Sep. 2003, pp. 2115-2125, XP004431409.

L. Bechelli, et al.: "Biometrics Authentication with Smartcard" Technical Report Istituto di Informatica E Telematica, No. Aug. 2002, Mar. 2002, pp. 1-12, XP002270622.

M. Kuyper, et al.: "Ein Eclipe Plugin zur Entwicklung von Java-card-Applets", Javaspektrum Cebit 2003, 2003, pp. 18-20, XP002364400.

The BioAPI Consortium, "BioAPI Specification," Version 1.1, Mar. 16, 2001, pp. 1-119.

J. Daugman, "Biometric Decision Landscapes," University of Cambridge Computer Laboratory, Jan. 2000, 15 pages.

CMVP Program Staff, "Derived Test Requirements for FIPS PUB 140-2, Security Requirements for Cryptographic Modules," Feb. 12, 2003. pp. 1-118.

Global Platform, "GlobalPiatform Card Customization Guide," Version 1.0, Aug. 13, 2002, pp. 1-83.

Global Platform, "Card Specification," Version 2.1.1, Mar. 2003, pp. 1-237.

Global Platform, "Card Specification 2.1.1 Errata & Precisions List 1.1," Oct. 2003, pp. 1-6.

Global Platform, "Card Specifications 2.1.1 & 2.1 Frequently Asked Questions," Oct. 2003, pp. 1-27.

Global Platform, "Card Specification 2.1.1 Release Notes," Jun. 2003, pp. 1-5.

Global Platform "GlobalPlatform Device API Specification Summary," date of reference is unclear but ay be as early as Nov. 24, 2004, 3 pages.

Global Platform, "Guidelines for Using GPD 2.0/STIP 2.1 API," Version 1.0, May 2003, pp. 1-83.

Global Platform, "Guide to Common Personalization," Version 1.0, Mar. 2003, pp. 1-59.

Global Platform "A Primer to the Implementation of Smart Card Management and Related Systems," Version 1.0, Oct. 2000, pp. 1-47.

Global Platform "GlobalPlatform Key Management System Functional Requirements," Version 1.0, Nov. 2003, pp. 1-64.

Global Platform, "Load and Personalization Interface Specification," Version 1.0, Mar. 2003, pp. 1-41.

Global Platform, "GlobalPlatform Messaging Specification," Version 1.0, Oct. 2003, pp. 1-104.

Global Platform, "Multi Application Smart Card Management Systems Functional Requirements," Version3.2, May 2001, pp. 1-84.

Global Platform, "Multi Application SCMS GP Functional Requirements 3.4 Errata & Precisions List 0.1," Dec. 2002, pp. 1-5.

Global Platform, "GlobalPlatform Systems Profiles Specification; An XML Representation," Version 1.1.0, Sep. 24, 2003, pp. 1-145.

Global Platform, "GlobalPlatform Systems Scripting Language Specification; An ECMAScript Representation," Version1.1.0, Sep. 24, 2003, pp. 1-209.

R. Bolle, et al.: "IBM Research Report Biometrics 101," IBM Research Division, Yorktown Heights, NY, Jun. 10, 2002, pp. 1-136.

F. Podio, et al.: "CBEFF: Common Biometric Exchange File Format," National Institutes of Standards and Technology, Jan. 3, 2001, pp. 1-32.

F. Podio, "Biometrics—Technologies for Highly Secure Personal Authentication," Convergent information Systems Division, Information Technology Laboratory, National Institute of Standards and Technology, date of reference is unclear but may be as early as Nov. 7, 2004, pp. 1-9.

\* cited by examiner

METHOD FOR IMPROVING FALSE ACCEPTANCE RATE DISCRIMINATING FOR BIOMETRIC AUTHENTICATION SYSTEMS

This is a non-provisional application of provisional application No. 60/627,969 filed Nov. 16, 2004.

FIELD OF INVENTION

The present invention relates generally to a data processing method, system and computer program product and more specifically to a method, system and computer program product for performing multiple biometric sample authentications incorporating a security token for meeting or favorably exceeding a predetermined error rate.

BACKGROUND

The use of biometrics for user verification and identification purposes is becoming increasingly popular in the computer industry. One of the major advantages in using biometrics is the reduction in the number of usernames and passwords a user has to memorize to access a computer system or secure resources. However, unlike traditional usernames and passwords where exact matches are made between entered and reference passwords, biometric authentications are probabilistic in nature.

An acceptable tolerance range is required to compensate for variations encountered due to physiological and environmental changes, differing signal to noise ratios, processing algorithm differences and other influences which impact the matching of an inputted biometric sample to an enrolled reference biometric template. The inclusion of the acceptable tolerance range for matching between an inputted biometric sample and a reference biometric template affects the accuracy of the biometric identification system by either falsely rejecting a valid input or falsely accepting an invalid input. These undesired effects are generally expressed in terms of a false rejection rate (FRR) and a false acceptance rate (FAR). The false rejection and false acceptance rates are generally determined empirically from a statistically significant biometric sampling population.

For example, one of the most commonly employed biometric features utilizes fingerprints to perform biometric identifications. In the relevant art, fingerprint biometric identification systems which utilize a single fingerprint have been empirically determined to have identification accuracies in the range of 95-99%. This range is probably adequate for many implementations where false acceptance is of secondary importance to false rejection. For example, replacement of the standard username/password login with a biometric input on a home computer system.

The use of biometrics may simplify access by various family members by eliminating the need to remember username/password combinations. In the home environment, the population of users and the number of authentication transactions conducted are of a sufficiently small size that the chances of encountering an undesired result are negligible. Furthermore, even if a false acceptance were to occur, the information being protected is unlikely to be of such significant economic value to warrant the expense of providing greater protections.

On the other hand, in an enterprise or governmental setting where large numbers of identification transactions occur and the information being protected may have significant economic value and/or is otherwise highly sensitive, this authentication accuracy range becomes exceedingly inadequate, particularly when large populations are to be identified. When large populations are to be identified, the false acceptance rate (FAR) tends to increase geometrically. A detailed discussion of this phenomenon and a proposed solution is provided in U.S. Pat. No. 6,160,903 to a common inventor/assignee. This patent is herein incorporated by reference.

In high security implementations, the US National Institute of Standards and Technology (NIST) have recently promulgated a requirement in their draft specification, "Derived Test Requirements for FIPS PUB 140-2, Security policy requirements for Cryptographic Modules," Feb. 12, 2003, of a false acceptance to be less than 1:1,000,000. To accomplish this level of security, various mechanisms have been proposed in the relevant art.

For example, US patent application 2001/0126881 A1 to Langley, discloses a multi-biometric scanner/processor arrangement in which two or more biometric features of a user are scanned simultaneously. This arrangement reduces the probability of a false acceptance by $(P_{FA})^n$ of the false acceptance probabilities, where $P_{FA}$ is the probability of false acceptance and n is the number of entered biometric samples. Using the false acceptance probability of 0.05 would require about five independent biometric inputs to exceed the 1:1,000,000 threshold requirements.

In another example, U.S. Pat. No. 6,393,139 B1 to Min-Hsiung Lin, discloses a multi-biometric input arrangement which requires a specific sample entry sequence. The patent further discloses an enrollment method which determines a quality factor for each biometric input for deciding which biometric inputs are suitable for the entry sequence. This arrangement further reduces the false acceptance probability by at least $(P_i*(n^{-1}))*(P_{FA})^n$ where $P_i$ is the probability of entry of an independent sample input, $P_{FA}$ is the probability of false acceptance and n is the number of entered biometric samples. In this example, using the false acceptance probability of 0.05 would require less than five independent biometric inputs to exceed the 1:1,000,000 threshold requirements. Thus, by adding a unique sequence to a biometric authentication process, the total number of biometric authentications may be reduced.

In another example, U.S. Pat. No. 6,408,290 to Thiesson, et at., discloses improved Bayesian networks. The Bayesian networks provide the advantages of a neural network which facilitates expert decision-making using dynamic system inputs such as those frequently encountered in biometric authentication systems. However, the Thiesson reference does not address how the Bayesian networks may be implemented in biometric identification systems to discriminate against false acceptances.

Thus, it would be highly advantageous to provide a mechanism where a combination of multiple biometric sample inputs from related and/or unrelated physiological features of a user are evaluated using either a Bayesian network or security policy based arrangement to meet or exceed predetermined error rate.

Additional background information relative to combining biometric authentication transactions to reduce error rates is included in the following treatises and patents, which are herein incorporated by reference;

[1] IBM Research Report Biometrics 101 by Rudolf M. Bolle, Jonathan Connell, Sharathchandra Pankanti, Nalini K. Ratha, Andrew W. Senior, RC22481 (W0206-033), Jun. 10, 2002.

[2] Biometric Decision Landscapes, John Daugman, University of Cambridge, Jan. 1, 1999.

[3] U.S. Pat. Nos. 6,038,334 and 6,072,891, both entitled "Method of gathering biometric information," to Hamid, et al., a common inventor and to a common assignee.

SUMMARY

Some of the embodiments described herein address the limitations described above and provide a mechanism for reducing the false acceptance rate(s) associated with biometric authentications to a predetermined level.

IN some embodiments, one or more biometric samples are provided and authenticated by a computer system and a security token or a security token alone. Biometric sample processing is generally performed using a computer system, an authentication server or a combination thereof with final arbitration of a result performed by a security token.

The term "security token" as described herein includes hardware based security devices such as cryptographic modules, smart cards, integrated circuit chip cards, portable data carriers (PDC), personal security devices (security token), subscriber identification modules (SIM), wireless identification modules (WIM), USB token dongles, identification tokens, secure application modules (SAM), hardware security modules (HSM), secure multi-media token (SMMC), trusted platform computing alliance chips (TPCA) and like devices.

Some method embodiments described herein comprise: inputting one or more biometric samples from a user; selecting from among a plurality of available processing units, a set of processing units which will generate intermediate results from the processing of the one or more biometric samples; processing at least a portion of the one or more biometric samples by the selected set of processing units to at least provide the intermediate results and arbitrating by the security token, the intermediate results to generate a final result which at least meets a predetermined security policy. In one embodiment, at least a portion of the security policy is maintained as a secret by the security token.

In one embodiment, the arbitration comprises implementation of one or more logic based rules, verification that generation of the final result will be within an acceptable boundary associated with the predetermined security policy, a vote determined from the intermediate results or a combination thereof, or matching of intermediate results by the security token using reference biometric templates stored inside the security token.

In another embodiment, the processing of the biometric sample(s) may be performed recursively, sequentially or a combination thereof among the selected set of processing units.

In an embodiment, selection of the processing units is determined at least in part heuristically and/or by implementation of one or more pre-established security policies, and/or by quality factors and/or matching scores determined from the one or more biometric samples. In another embodiment, the plurality of processing units comprises a plurality of discrete biometric processing applications distributed among one or more networked computer systems.

In another embodiment, the intermediate results are generated in a standardized format usable by two or more of the selected set of processing units. This allows one processing unit to act as a preprocessor for another processing unit.

In an embodiment, the biometric sample(s) are inputted in a predetermined sequence which is verified as part of an authentication process. The predetermined sequence is maintained as secret known to at least the user.

In one embodiment, the plurality of available processing units comprises a plurality of discrete biometric processing applications which may exist on a single computer system or distributed among a plurality of computer systems and an authentication server.

Some method embodiments comprise: inputting by a user a plurality of biometric samples, where at least a portion of the plurality of biometric samples are inputted in a predetermined sequence; selecting from among a plurality of available processing units, a set of processing units which will generate intermediate results from the processing of the inputted one or more biometric samples; processing at least a portion of the one or more biometric samples by the selected set of processing units to at least provide the intermediate results, verifying the predetermined sequence and arbitrating the intermediate results to generate a final result which at least meets a predetermined security policy. In such embodiments the arbitrating is performed by a security token. Again, at least a portion of the predetermined security policy is maintained as a secret by the security token.

The arbitration process may comprise implementation of one or more logic based rules, verification that generation of the final result will be within an acceptable boundary associated with the predetermined security policy, a vote determined from the intermediate results or a combination thereof.

The predetermined sequence may be a secret known to the user and may be inputted serially, simultaneously or a combination thereof.

In an embodiment, the biometric sample(s) may arise from similar anatomical features, dissimilar anatomical features or a combination thereof.

In another embodiment, the plurality of available processing units may comprise a plurality of discrete biometric processing applications which may be distributed among a plurality of computer systems and an authentication server.

In any of the above-discussed method embodiments, the predetermined security policy may be stored locally to the computer system, retrieved from the security token or may be a part of an overall system security policy.

System embodiments may include at least one computer system and an operatively coupled security token. The at least one computer system may include one or more operatively coupled biometric input devices and a plurality of biometric processing devices. The plurality of biometric processing devices may provide the at least one computer system with the functionality to:

receive one or more biometric samples inputted via the one or more biometric input devices;

select from among the plurality of biometric processing devices, a set of biometric processing devices which will generate intermediate results from the processing of the inputted one or more of biometric samples;

process at least a portion of the one or more biometric samples by the selected set of biometric processing devices to at least provide the intermediate results; and arbitrate the intermediate results to generate a final result which at least meets said predetermined security policy, where at least a portion of the processing or the arbitration is performed by the security token.

In an embodiment, the biometric sample(s) are inputted in a predetermined sequence which includes both serial and simultaneous inputting. In a related embodiment, the set of biometric processing devices further includes a verifier that verifies the predetermined sequence.

In another embodiment, the processing of the biometric sample(s) may be performed recursively, sequentially or a combination thereof among the set of biometric processing devices where the set of biometric processing devices is distributed among a plurality of computer systems and an authentication server.

Another systematic embodiment may include at least one computer system including: a first processor; a security token interface coupled to the first processor, a first memory operatively coupled to the first processor; one or more biometric scanners is coupled to said first processor; a biometric datastore operatively coupled to the first processor having a plurality of reference biometric templates retrievably stored therein and at least one biometric processing application operatively stored in at least a portion of the first memory.

The at least one biometric processing application having logical instructions executable by the first processor to select from among a plurality of available biometric processing applications, a set of biometric processing applications which will generate intermediate results by processing one or more biometric samples received from the one or more biometric scanners, cause at least a portion of the one or more biometric samples to be processed by the selected set of biometric processing applications to at least provide the intermediate results and cause the intermediate results to be arbitrated into a final result.

The system may further comprise a security token including a second processor, a second memory, at least one of the plurality of reference biometric templates operatively stored in at least a portion of the second memory; and at least one token biometric processing application operatively stored in at least another portion of the second memory having logical instructions executable by the second processor to perform the arbitration to determine the final result in accordance with the predetermined security policy stored in yet another portion of the second memory.

The set of biometric processing applications or at least one token biometric processing application may further include logical instructions executable by the first or second processor to allow access to one or more secure resources if the final result is affirmative.

In another embodiment, the one or more biometric samples may be input in a predetermined sequence and verified by either the set of biometric processing applications or the least one token biometric processing application. The predetermined sequence is intended to be maintained as a secret known to at least the user.

The plurality of available biometric processing applications may be distributed among a plurality of computer systems and an authentication server in a distributed processing arrangement.

The portion of the one or more biometric samples to be processed by said plurality of available biometric processing applications/units is dependent on the type of biometric sample being processed and on the processing being used. For example some processing algorithms convert a fingerprint into a series of vectors, others utilize optical scanning techniques, still others determines capacitive changes in a grid.

A computer program product includes programs and associated data recorded on optical, magnetic or logical transportable digital recording media such as a CD ROM, floppy disk, data tape, DVD, flash RAM or removable hard disk for installation on a security token enabled client, and/or authentication server and/or security token. The programs and associated data may be stored on the transportable digital recording media in a code format including byte code, compiled, interpreted, compliable and interpretable.

BRIEF DESCRIPTION OF DRAWINGS

Features and advantages of the invention will become apparent from the following detailed description when considered in conjunction with the accompanying drawings. Where possible, the same reference numerals and characters are used to denote like features, elements, components or portions of the invention. Optional components are generally shown in dashed lines. It is intended that changes and modifications can be made to the described embodiment without departing from the true scope and spirit of the subject invention as defined in the claims.

DETAILED DESCRIPTION

Some embodiments described herein provide a mechanism for reducing the false error rate associated with biometric authentication systems to meet or exceed a predetermined security policy. The applications may be programmed in a high level language such as Java™, C++, C, C# or Visual Basic™.

Figure 1:
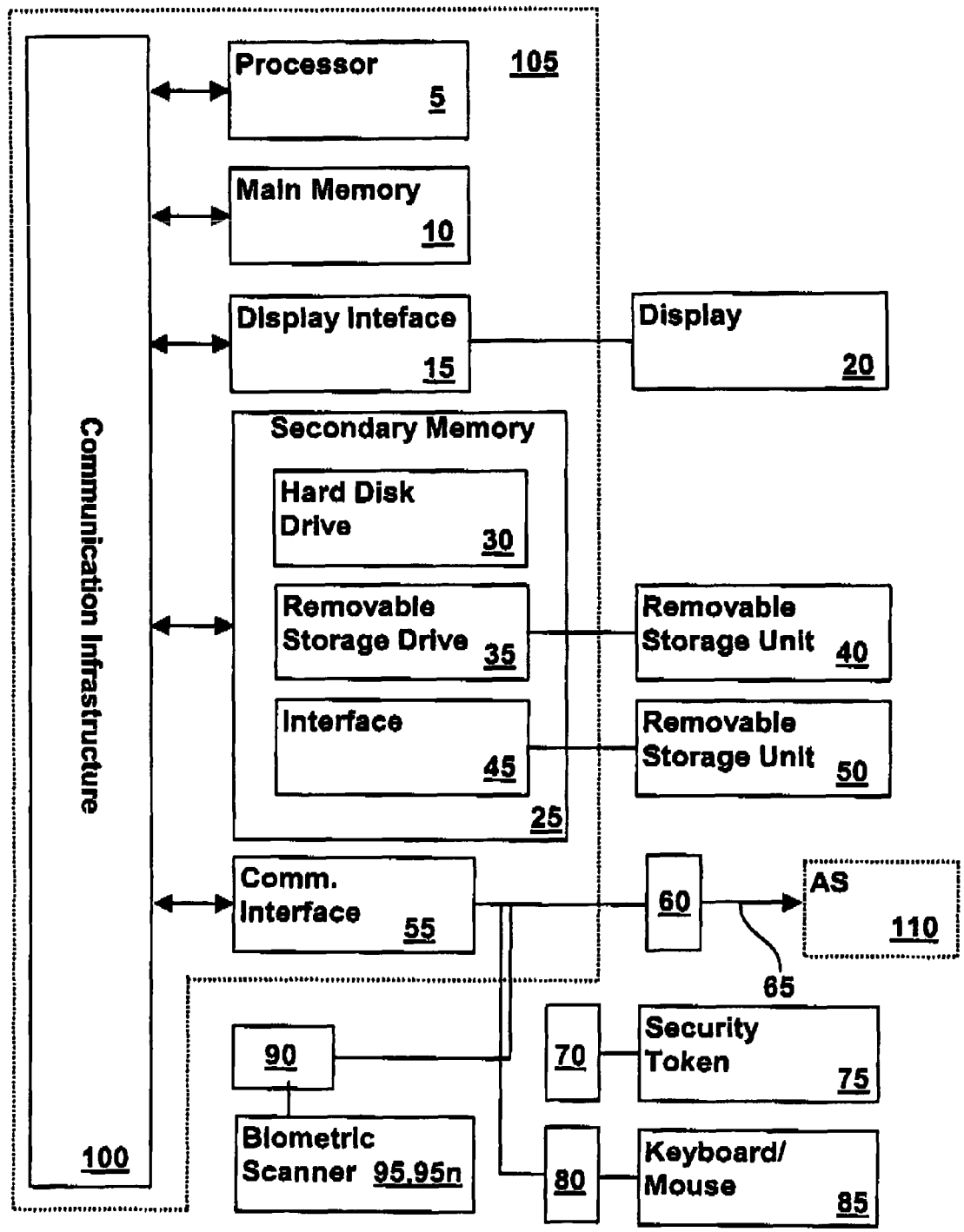
FIG. 1—is a generalized block diagram of a computer system and associated peripheral devices including a functionally connected security token.

Referring to FIG. 1, a functional block diagram of a computer system 105 and associated peripherals is shown including a processor 5, a main memory 10, a display 20 electrically coupled to a display interface 15, a secondary memory subsystem 25 electrically coupled to a hard disk drive 30, a removable storage drive 35 electrically coupled to a removable storage unit 40 and an auxiliary removable storage interface 45 electrically coupled to an auxiliary removable storage unit 50. The display device 20 may include a touch sensitive screen to simplify user inputs.

A communications interface 55 subsystem is coupled to a network 65 via a network interface 60. The network 65 includes traditional wired, optical or wireless networks which preferably incorporates a secure communications protocol comprising secure socket layer (SSL), transport layer security (TLS), private communications technology (PCT) or internet protocol security (IPsec.)

A security token 75 is operably coupled to the communications interface 55 via a security token interface 70. User input devices such as a mouse and a keyboard 85 are operatively coupled to the communications interface 55 via a user interface 80. Lastly, one or more biometric scanners 95, 95n are operatively coupled to the communications interface 55 via a biometric scanner interface 90.

The processor 5, main memory 10, display interface 15, secondary memory subsystem 25 and communications interface system 55 are electrically coupled to a communications infrastructure 100, commonly known as I/O bus. The computer system 105 includes an operating system, one or biometric processing applications, a security token application programming interface, one or more security token aware applications, cryptography software capable of performing symmetric and asymmetric cryptographic functions, secure messaging software and all necessary device interface and driver software.

The security token 75 includes a wireless, optical and/or electrical connection means compatible with the security token interface 70, a microprocessor, a cryptography co-processor, volatile and non-volatile memory electrically coupled to the processor and co-processor, a runtime operating environment, cryptography extensions available to the runtime environment and capable of performing symmetric and asymmetric cryptographic functions compatible with the computer system's cryptography software, a security executive application, one or more biometric result arbitration applications and at optionally at least one reference biometric template.

The security executive application includes the ability to receive one or more intermediate results provided by the one or more biometric processing applications installed on the computer system CS 105. In distributed processing embodiments, a plurality of computer systems are interconnected by a network and include at least one biometric processing application installed per computer system. In the distributed processing embodiments, an authentication server 110 may be employed which allows the accumulation of biometric processing statistics for determination of the most appropriate biometric processing application(s) for a particular type of biometric sample under a particular set of sampling conditions. The accumulation of biometric processing statistics may further be used to heuristically modify the initial security policies settings which control the use of a particular biometric processing application.

The biometric samples input by a user may be selectively processed by one or more of computer systems to generate the intermediate results for final arbitration by the security token 75. The selection of biometric processing applications and/or computer systems used in processing the biometric sample(s) is controlled by one or more security policies installed on the computer system 105, security token 75 or both. The combination of biometric processing applications and computer systems is referred to generically as processing units.

The security policies may be arranged as described in co-pending U.S. patent application Ser. No. 10/402,960, filed on Apr. 1, 2003, entitled "Uniform Framework for Security Tokens," published on Jun. 24, 2004 as U.S. Patent App. Pub. No. 2004-0123152 A1, and Ser. No. 10/425,028, filed on Apr. 29, 2003, entitled "Uniform Modular Framework For A Host Computer System," published on Nov. 4, 2004 as U.S. Patent App. Pub. No. 2004-0221174 A1, to a common inventor/assignee, both of which are herein incorporated by reference. The security policies includes but are not limited to access control rules, biometric processing methodology, private or partial enrollment information, and biometric processing sequences.

The biometric scanner(s) 95,95n may be of the same type for receiving biometric samples having like biometric characteristics, for example fingerprints, or dissimilar types of biometric scanners to receive biometric samples having differing characteristics (i.e., multi-modal biometric authentication), which allows combinations of biometric sample inputs, for example, fingerprints and iris scans.

Figure 2:
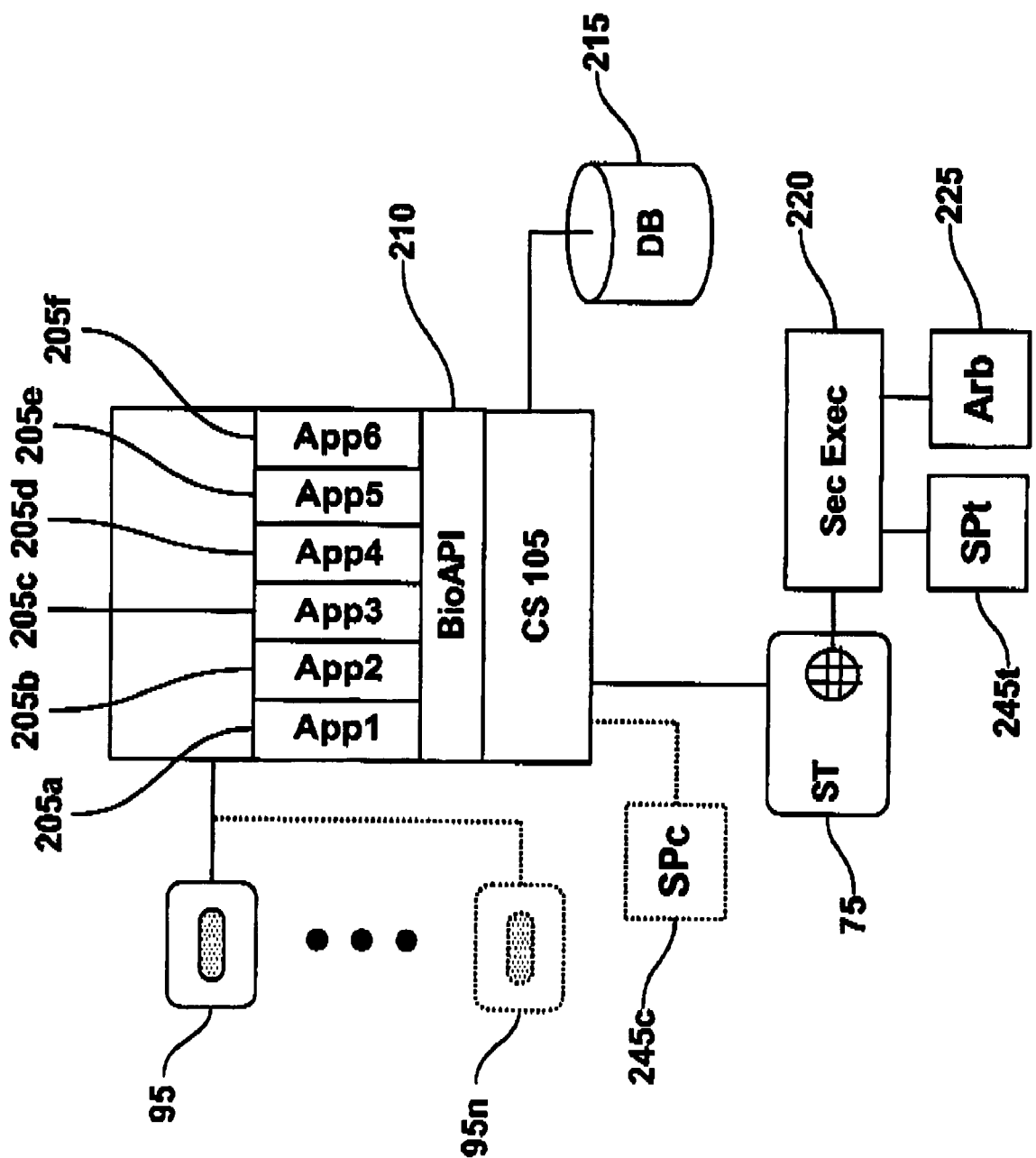
FIG. 2—is a detailed block diagram illustrating an embodiment of the invention including applicable system components and devices for implementing an embodiment of the invention.

Referring to FIG. 2, a plurality of biometric processing applications App1 205a, App2 205b, App3 205c, App4 205d, App5 205e, App6 205f provides the computer system 105 with the functionalities to receive one or more biometric samples input by the user via the biometric scanner(s) 95, 95n, perform the necessary data processing to extract the pertinent biometric features of interest associated with the particular type(s) of biometric samples inputted, generate a plurality of intermediate results from the processed biometric samples in conjunction with reference biometric template data stored in a biometric database DB 215 and send the intermediate results to the security token ST 75 for final arbitration by an arbitration application Arb 225 installed inside the security token ST 75. The intermediate results may be a plurality of sample biometric templates used for comparison with the retrieved reference biometric templates, quality factors for determining additional processing needs, matching scores, votes, results of processing an input sequence or a combination thereof.

In some embodiments, the token security executive application Sec Exec 220 and the token arbitration application Arb 225 are intended to be plug-in modules which interface with a standardized token application programming interface (not shown) such as that described in "GlobalPlatform Card Specification v2.1.1," March 2003. The GlobalPlatform specification is available at www.globalplatform.org. The arbitration application Arb 225 may include the ability to perform a biometric authentication transaction in addition to arbitration.

The number of biometric processing applications App1 205a, App2 205b, App3 205c, App4 205d, App5 205e, App6 205f is arbitrarily shown as six. The actual number of biometric processing applications may be tailored to meet a specific security policy.

In some embodiments, the biometric processing application(s) 205a, 205b, 205c, 205d, 205e, 205f are coupled to a standardized biometric application programming interface BioAPI 210 such as BioAPI developed by the BioAPI Consortium. A description of the proposed biometric application programming interface is described in "BioAPI Specification Version 1.1," Mar. 16, 2001 and is available at www.bioapi.org. One skilled in the art will appreciate that a single biometric application having different invokable methods, functions or subroutines will work with or without a standardized biometric applications programming interface.

In some embodiments, the token's security executive application Sec Exec 220 in conjunction with the token arbitration application Arb 225 and either or both the token and/or computer system's security policies SPt 245t, SPc 245c becomes the final gatekeeper to allow an authenticated user to access one or more secure resources. The security policy SPc 245c associated with the computer system CS 105 is optional and may be retrieved or derived from the token security policy SPt 245t. The biometric database DB 215 includes a plurality of reference biometric templates which are retrievable by using a variable unique to the user. The variable is a unique token identifier or serial number associated with both the user and security token. The reference biometric templates may be compared with one or more of the intermediate processing results as part of a user authentication process.

Figure 2A:
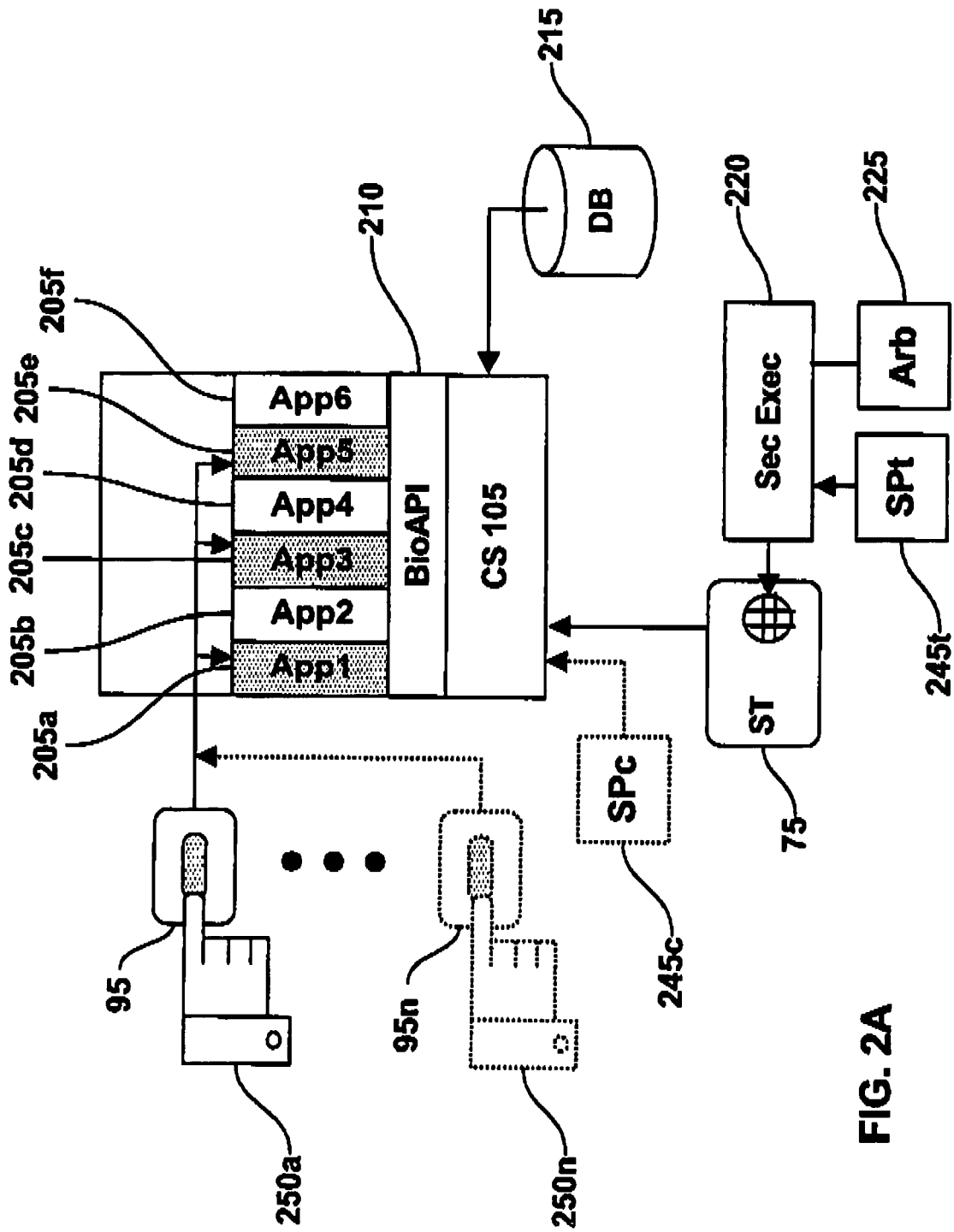
FIG. 2A—is a detailed block diagram of a user inputting a plurality of biometric samples for processing by the computer system.

Referring to FIG. 2A, a designated set of biometric processing applications App1 205a, App3 205c, App5 205e, are selected by either or both the token and/or computer system's security policies SPc 245c SPt 245t to receive a plurality of biometric samples input 250a, 250n by a user via the biometric scanner(s) 95, 95n.

The selected set of biometric processing applications App1 205a, App3 205c, App5 205e performs the data processing in conjunction with related information retrieved from the biometric database DB 215 for extracting the pertinent biometric features of interest associated with the particular type(s) of biometric samples inputted for generating a plurality of intermediate results for final arbitration by the security token ST 75. The processing of the inputted biometric samples may be performed either in parallel or in series.

In some embodiments, one biometric processing application may preprocess a biometric sample for another biometric processing application based on a particular security policy. In other embodiments, additional authentication requirements are provided for which requires the user to input his or her biometric samples in a predetermined sequence. The sequence is maintained as a secret by the user and is used to further reduce the overall false acceptance rate, particularly in situations where a required false acceptance rate would be difficult to achieve using the particular types of biometric samples provided. The predetermined sequence may be stored locally on the computer system CS 105 as part of the computer system's security policy SPc 245c or retrieved from the security token ST 75 as part of the token security policy SPt 245t.

Depending on the level of security required, the biometric sample input sequence may be used to supplement deficiencies encountered during the user authentication process should one or more of the biometric sample templates fail authentication or if the user incorrectly inputs his or her biometric samples in the wrong order. In the highest level of security, both the user authentication process and biometric sample input sequence must be correct before allowing access to the one or more secure resources. This arrangement is indicative of an AND security policy.

In reduced levels of security, deficiencies encountered during the user authentication process or biometric sample input sequence may still allow access to secure resources if the required false acceptance rate can still be achieved. This arrangement is indicative of an OR security policy.

Combining biometric authentication through an AND operation improves the false acceptance rate at the expense of the false rejection rate, while combining biometric authentication through an OR operation improves the false rejection rate at the expense of the false acceptance rate.

This is one of the many security policy decisions necessary to balance security and user convenience. In related embodiments, both the minimum number of authenticated biometric samples and provided in the proper sequence are required before access is allowed to one or more secure resources. The required sequence for example may include a combination of fingerprints obtained from the same or differing fingers from either or both hands or a combination of fingerprints and iris scans provided in a predetermined order. One skilled in the art will appreciate that the many combinations of biometric sample inputs may be used to provide a secret biometric sample input sequence.

Figure 2B:
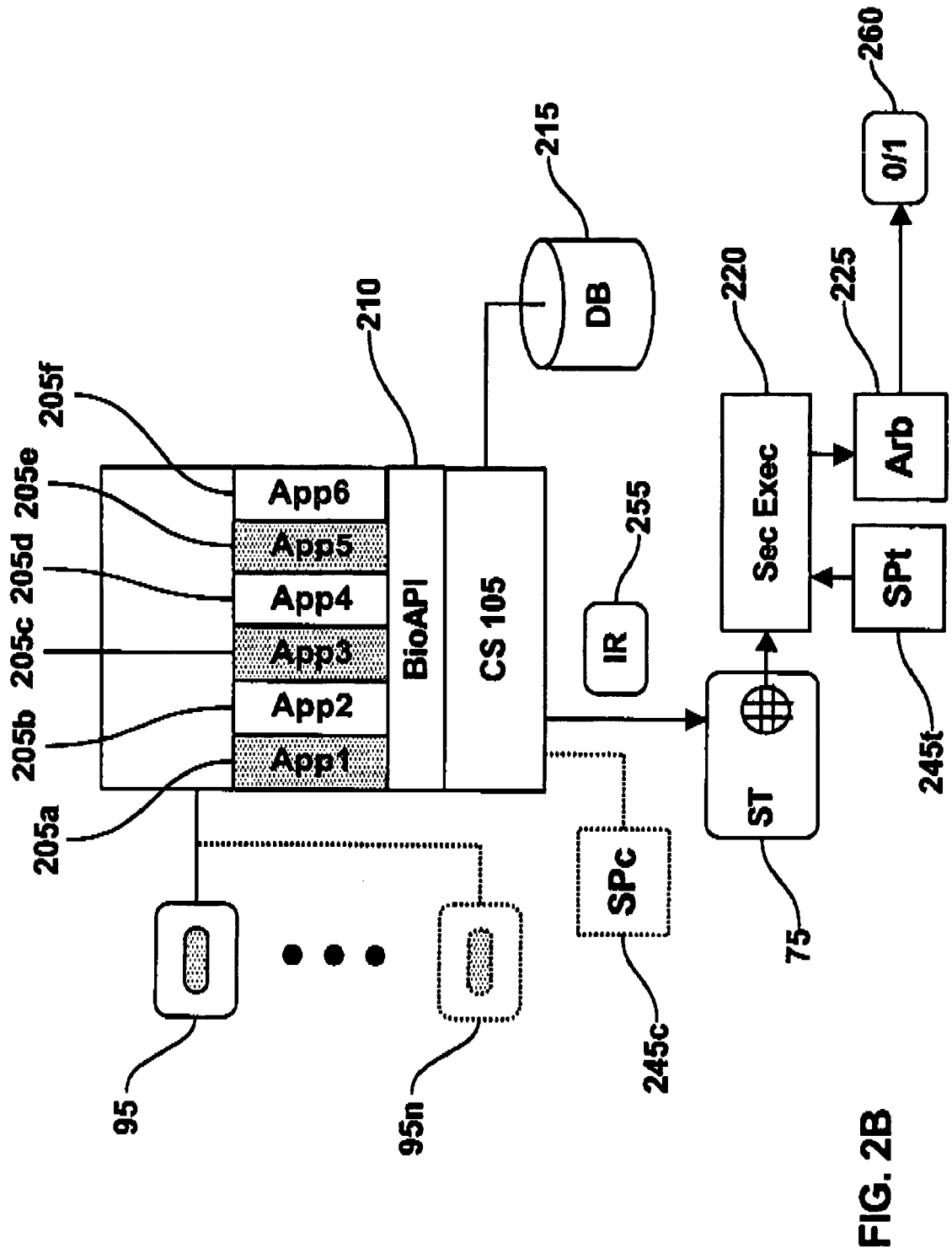
FIG. 2B—is a detailed block diagram of one embodiment of the invention where the computer system processes the plurality of inputted biometric samples and generates a plurality of intermediate results for arbitration by a security token.

Referring to FIG. 2B, the designated biometric processing application(s) App1 205a, App3 205c, App5 205e send their processed intermediate results IR 255 to the security token ST 75 for final arbitration. The security executive application Sec Exec 220 in conjunction with the token security policy SPt 245t and arbitration application Arb 225 determines a final result 260 from the received intermediate results IR 255.

Figure 2C:
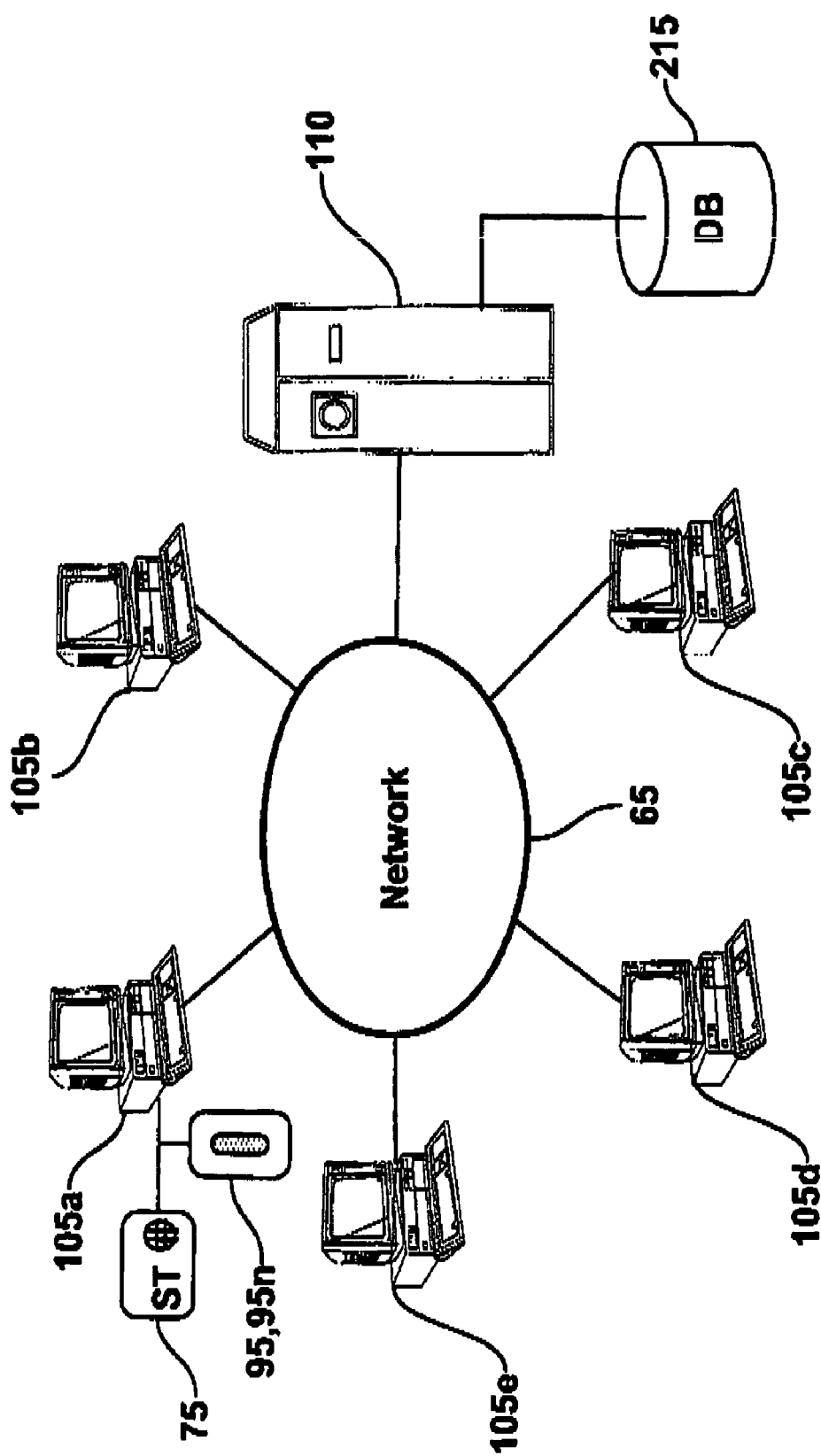
FIG. 2C—is a general block diagram of another embodiment of the invention where a plurality of computer systems and/or processing units are configured to process a plurality of biometric samples.

Referring to FIG. 2C, a distributed processing embodiment is shown which allows a plurality of computer systems 105a, 105b, 105c, 105d, 105e and an authentication server 110 are interconnected by a network 65 to perform different biometric processing tasks which are arbitrated by a security token ST 75 connected to one of the computer systems 105a.

In addition, the inclusion of the authentication server 110 allows the accumulation of biometric processing statistics in the biometric database DB 215 for determining the most appropriate biometric processing application(s) for a particular type of biometric sample under a particular sampling condition. The accumulation of biometric processing statistics may further be used to heuristically modify the initial security policies settings which control the use of a particular biometric processing application.

The types of biometric statistics accumulated include biometric sample type information, biometric authentication success rates, biometric image quality factors, matching scores, biometric processing progressions associated with routing and advantageous sequential processing by a series of processing units over time.

The distribution of biometric processing applications among the plurality of computer systems 105a, 105b, 105c, 105d, 105e, 110 may be varied to optimize processing performance and adjust for bandwidth considerations. The distributed biometric processing applications and computer systems will hereinafter be referred to generically as processing units.

Figure 2D:
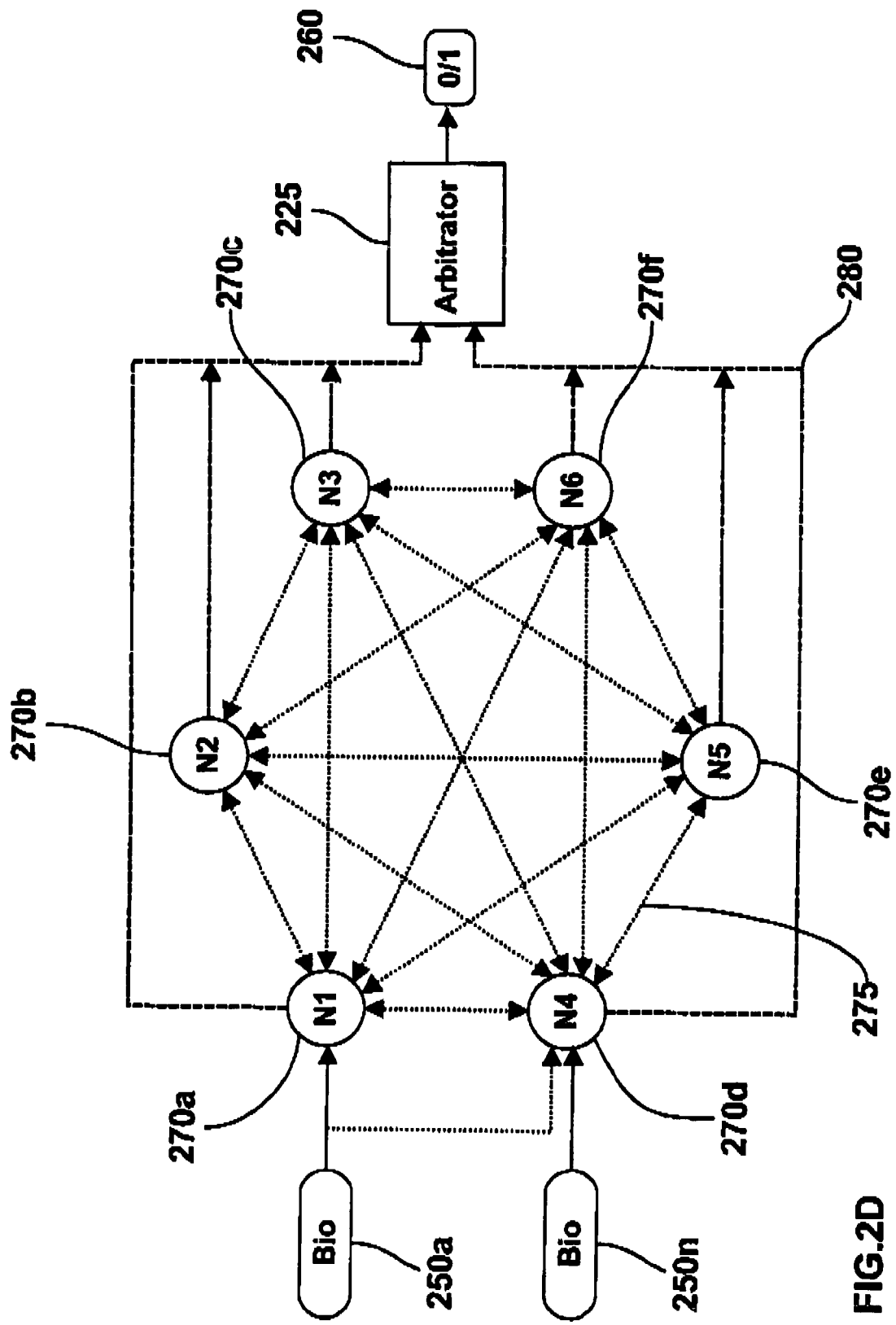
FIG. 2D—is a detailed block diagram of depicting a series of processing units which may perform one or more biometric processing functions associated with a related type of biometric sample input.

Referring to FIG. 2D, a diagrammatic presentation of an illustrative embodiment is depicted which receives one or more biometric samples 250a, 250n of a related type. A series of processing units N1 270a, N2 270b, N3 270c, N4 270d, N5 270e, N6 270f are in processing communications with each other and an arbitrator 225. The processing units N1 270a, N2 270b, N3 270c, N4 270d, N5 270e, N6 270f includes separate computer systems, separate biometric processing applications within a single computer system and a combination of separate biometric processing applications distributed among various networked computer systems. The arbitrator is a security token. In this arrangement, the one or more biometric samples 250a, 250n of a related type (e.g., fingerprints) are received by the processing network at the entry units 270a and/or 270d.

Depending on the type of logic arrangement employed, (security policy, heuristic or hybrid) the biometric samples 250a, 250n are initially processed by either or both of the input processing units N1 270a, N4 270d to produce one or more intermediate results (not shown). The input processing units N1 270a, N4 270d perform initial attempts to match the sample biometric templates against one or more reference biometric templates (not shown) or determine quality factors used to distribute the biometric samples to the processing units most suited to processing the biometric samples having the associated quality factors. The quality factors may be based on image quality or signal to noise ratios. The capabilities of each processing unit N1 270a, N2 270b, N3 270c, N4 270d, N5 270e, N6 270f may be determined heuristically or empirically.

In some embodiments, the intermediate results are generated in a standardized format which allows one processing unit to act as a preprocessor for another processing unit. An example of a standardized file format is described in NISTIR 6529, "Common Biometric Exchange File Format (CBEFF)", by the National Institute of Standards and Technology (NIST), Jan. 3, 2001 available at www.itl.nist.gov/div895/isis/bc/cbeff. If the initial attempt to match or process one or more of the biometric samples is unsuccessful, the processed intermediate results or original biometric samples 250a, 250n may be routed 275 to another processing unit for further processing. In heuristic embodiments, an authentication server accumulates biometric sample type information, biometric authentication success rates, quality factors, matching scores and preferable processing progressions associated with routing and sequential processing by the processing units and related information over time.

For example, a biometric sample having certain characteristics or quality factors may always fail to be processed by processing unit N2 270b but may generally be successfully processed by processing unit N5 270e. Rather than attempting to process the biometric sample using processing unit N2 270b, the network routes the biometric sample directly to processing unit N5 270e.

Analogously, the biometric samples 250a, 250n may be processed sequentially by one or more of the processing units N1 270a, N2 270b, N3 270c, N4 270d, N5 270e, N6 270f, including a processing unit already attempted before being processed by another processing unit if the probability of a match based on the resulting characteristics of the processed sample are increased. Once processing by the processing units has been completed the intermediate results 280 are arbitrated 225 by the security token to determine a final result 260 (authenticated or not.) The accumulated information facilitates learning among the processing units of which particular processing unit(s) and/or processing progressions provides the best solution under a given situation or biometric sample characteristic.

In a security policy based processing arrangement, the incoming biometric samples 250a, 250n are initially processed by either or both of the input processing units N1 270a, N4 270d to produce one or more intermediate results (not shown). The input processing units N1 270a, N4 270d may perform initial attempts to match the sample biometric templates against one or more reference biometric templates (not shown) retrieved from the biometric database DB 215 or determine quality factors from the inputted biometric samples for further processing by additional processing units. In this arrangement, a simple rule dictates where subsequent processing of the biometric sample(s) 250a, 250n by another processing unit (if any) will occur.

For example, a simple rule associated with processing unit N1 270a may be devised as follows;

---

IF RESULT N1 = 0 THEN ((N2 OR (N3 AND N4) OR N5) NOT N6);
ELSE RESULT = 0;

---

Similar rules using standard Boolean and/or arithmetic operators may be developed for each of the processing units N1 270a, N2 270b, N3 270c, N4 270d, N5 270e, N6 270f which optimize matching probability, error rate discrimination and/or processing performance between and among the processing units. One skilled in the arts will appreciate that multiple combinations of both heuristic and security policy processing arrangements may be employed.

Alternately, or in combination therewith, the arbitrator 225 may include logic for verifying that generation of a final authentication decision 260 will be within an acceptable boundary associated with a predetermined security policy as described in U.S. Pat. No. 6,160,903 to a common inventor/assignee. In some embodiments which may be implemented alone or in combination with either of the preceding security policies allows an arbitrator 225 to determine a final authentication decision 260 by a vote determined from the results received from the processing units N1 270a, N2 270b, N3 270c, N4 270d, N5 270e, N6 270f. The voting process may be weighted to favor the intermediate results of one or more of the processing units N1 270a, N2 270b, N3 270c, N4 270d, N5 270e, N6 270f as determined heuristically or empirically. In voting embodiments, each of the selected group of processing units performs an authentication transaction and provides a pass/fail (0/1) intermediate result to the arbitrator 225 which determines the final result 260.

In other embodiments, a scoring arrangement is provided which allows the arbitrator 225 to determine acceptability of the inputted biometric samples for authentication purposes based on a combined score determined from the individual scores provided by the processing units 270a, 270b, 270c, 270d, 270e, 270f. The individual scores are determined from a fraction of matched features between the sample intermediate results and the reference biometric template(s).

In other embodiments, the processing units generate a sample biometric template which is used in providing a simple matching result (i.e., YES/NO or 0/1) which are then sent to the security token for final arbitration. Alternately, the processing units may generate one or more sample biometric templates 250a, 250n which are sent to the security token for matching as part of the final arbitration process.

In other embodiments, each of the biometric processing units may utilizes a different biometric processing application so that the extraction of relevant biometric features from the inputted biometric sample(s) 250a, 250n may be optimized to address variations in sampling conditions. A summary of the various arbitration arrangements is provided in Table 1 which follows. Alternately, the same biometric processing application may be applied to differing biometric samples inputted by the user. For example, the user may provide input fingerprints originating from different fingers which are processed by the same biometric processing algorithm.

TABLE 1

| | N1 | N2 | N3 | N4 | N5 | N6 | Reject | Pass | Comments* |
|---|---|---|---|---|---|---|---|---|---|
| QF | Relative image or signal quality estimated by algorithm(s) | | | | | | | | |
| 0-25 | — | — | — | — | — | — | X | — | Reject always |
| 26-50 | X | — | X | — | X | — | X | X | Pass IF N1 + N2 + N3 |
| 51-75 | — | X | — | X | — | X | X | X | Pass IF N2 + N4 + N6 |
| 76-100 | X | X | X | X | X | X | — | X | Pass always |
| Score | Actual false acceptance rate calculated by algorithm(s) | | | | | | | | |
| <10k | Combined score | | | | X | — | Reject always | | |
| 10k-20k | Combined score | | | | X | X | Variable | | |
| ≧20k | Combined score | | | | — | X | Pass always | | |
| Vote | Simple match dependent | | | | | | | | |
| 0/6 | 0 | 0 | 0 | 0 | 0 | 0 | X | — | Reject always |
| 1/6-5/6 | 1 | 0 | 1 | 0 | 1 | 0 | X | X | Variable |
| 6/6 | 1 | 1 | 1 | 1 | 1 | 1 | — | X | Pass always |
| Sequence | Input sequence dependent | | | | | | | | |
| 0/n | 0 | 0 | 0 | 0 | 0 | 0 | X | — | Reject always |

TABLE 1-continued

| | N1 | N2 | N3 | N4 | N5 | N6 | Reject | Pass | Comments* |
|---|---|---|---|---|---|---|---|---|---|
| <n/n | 1 | 0 | 1 | 0 | 1 | 0 | X | X | Variable |
| n/n | 1 | 1 | 1 | 1 | 1 | 1 | — | X | Pass always |
| Match | | | | Matched Templates** | | | | | |
| 0/n | 0 | 0 | 0 | 0 | 0 | 0 | X | | Reject always |
| <n/n | 1 | 0 | 1 | 0 | 1 | 0 | X | X | Variable |
| n/n | 1 | 1 | 1 | 1 | 1 | 1 | — | X | Pass always |

*Pass or reject is based on security policies and/or desired FAR. Entries provided in Table 1 are for example only. One skilled in the art will appreciate that combinations of Boolean, arithmetic, quality factors, scoring and voting may be incorporated into arbitration of a final result by the arbitrator.
**Matching templates performed by processing units and/or security token.

Figure 2E:
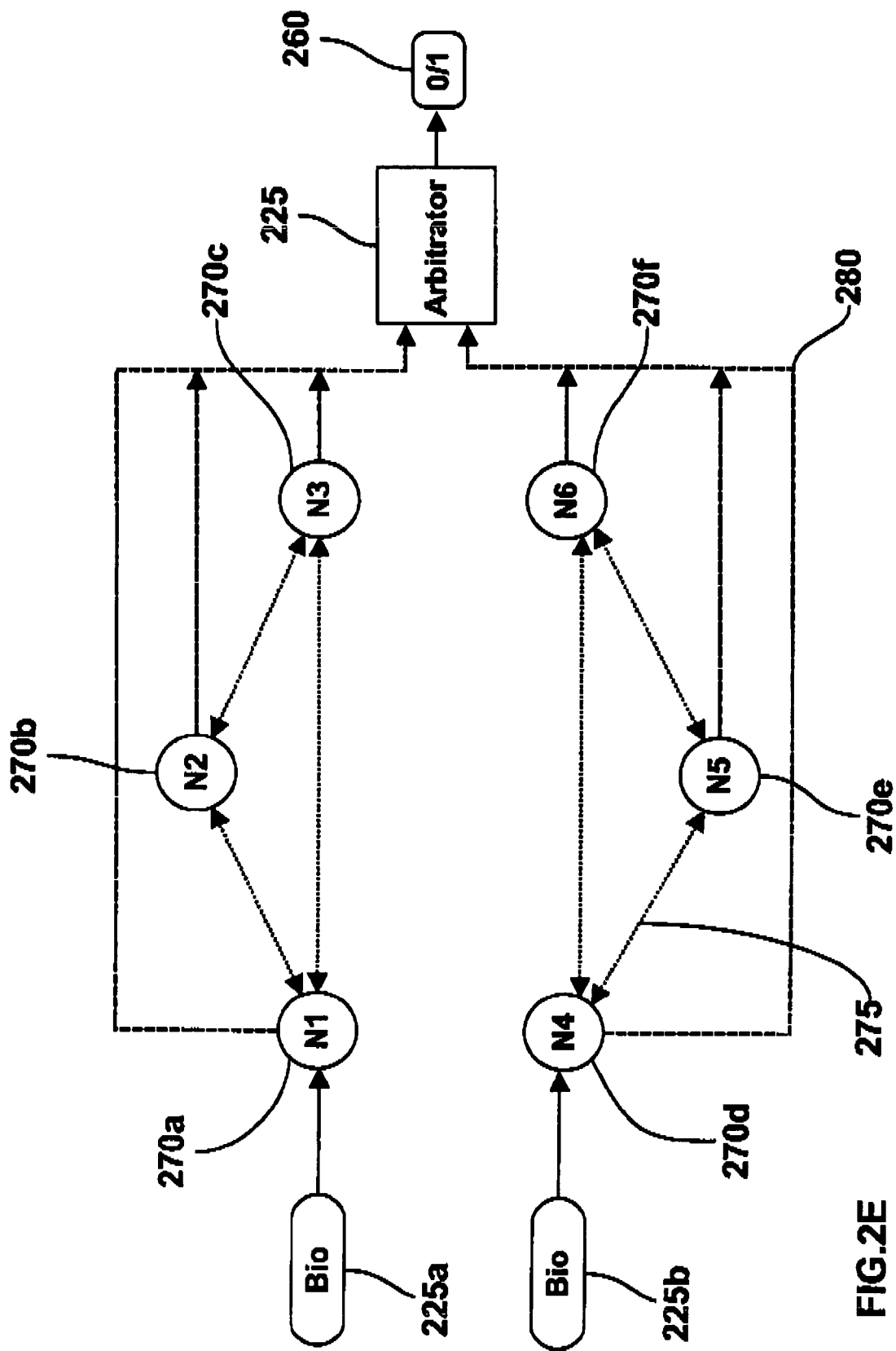
FIG. 2E—is a detailed block diagram of depicting a series of processing units which may perform one or more biometric processing functions associated with an unrelated biometric sample input.

Referring to FIG. 2E, a diagrammatic presentation is depicted which receives one or more biometric samples 250a, 250n of a dissimilar types for example a fingerprint and an iris scan. In this embodiment, the processing units N1 270a, N2 270b, N3 270c are designed for processing of one biometric sample type 250a and processing units N4 270d, N5 270e, N6 270f are designed for dissimilar biometric sample type 250n. In this embodiment, there is limited crossover processing capability between processing units N1 270a, N2 270b, N3 270c and N4 270d, N5 270e, N6 270f due to differences in processing of the inputted biometric samples.

One skilled in the art will appreciate that some common image or signal processing may occur but is expected to be considerably less than that described for like biometric sample types. Other aspects of this embodiment are analogous to the description provided for FIG. 2D above where the arbitrator 225 determines the final result 260 of the intermediate processing results performed by the processing units N1 27a, N2 270b, N3 270c, N4 270d, N5 270e, N6 270f.

Figure 3:
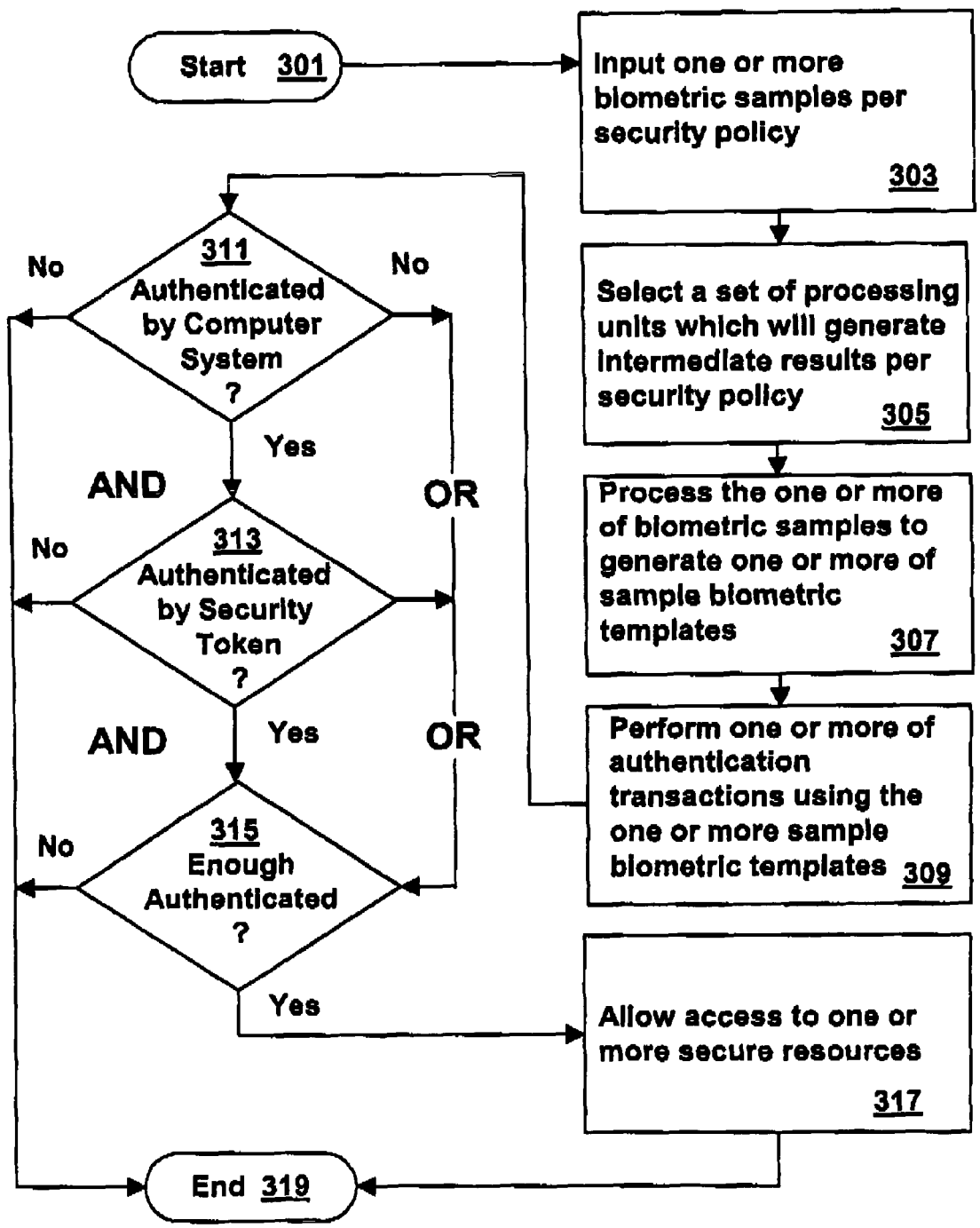
FIG. 3—is a flow diagram illustrating the major steps associated with implementing one embodiment of the invention.

Referring to FIG. 3, the major steps involved in implementing one embodiment are illustrated. The process is initiated 301 by a user inputting one or more biometric samples into one or more biometric scanners according to an existing security policy 303.

Based on the inputted biometric sample type and/or heuristically derived information, a set of processing units is selected which will generate a set of biometric sample templates according to the security policy 305. The inputted biometric samples are then processed using the selected set of biometric processing units to generate one or more of biometric sample templates for use in one or more authentication transactions 307. Once the biometric sample templates are generated, one or more authentication transactions are performed by comparing the generated biometric sample templates with a reference set of biometric templates 309 retrieved from a biometric database.

In some embodiments, the majority of biometric samples templates are authenticated by a computer system and a subset may be authenticated by a security token or another computer system.

Depending on the applicable security policies or heuristics if one or more biometric sample templates fail to be authenticated 311 by the computer system, processing ends 319 and the user is denied access to one or more secure resources 317. This arrangement is indicative of an AND security policy which requires all authentications to be successful.

If all the biometric sample templates intended to be authenticated by the computer system are authenticated 311 by the computer system(s), the remaining unauthenticated subset of biometric sample templates is sent to the security token for authentication. If any member of the subset of biometric sample templates fails authentication 313 by the security token or another computer system, processing ends 319 and the user is denied access to one or more secure resources 317. This arrangement is again indicative of the AND security policy which requires all authentications to be successful.

However, in an OR security policy, not all of the biometric sample templates must be authenticated 311 by the computer system(s). The failed biometric sample template(s) may be authenticated by the security token 313 or another computer system. If the security token or another computer system is unable to authenticate the failed biometric sample template(s) or the subset of the biometric sample templates, processing ends 319 and the user is denied access to the one or more secure resources 317.

This arrangement is indicative of a combination OR and AND security policy which requires all authentications to be successful but not necessarily on a single processing unit. If the security token or another computer system successfully authenticates 313 the received biometric sample template(s), a final authentication transaction is performed to determine if a sufficient number of biometric sample templates have been authenticated to meet a predetermined error rate or security policy 315; for example, a FAR of 1E-6.

If a sufficient number of biometric sample templates have been authenticated 315 to meet the predetermined security policy, the user is allowed access to the one or more secure resources 317. If however, an insufficient number of biometric sample templates have been authenticated 315 to meet the predetermined security policy, processing ends 319 and the user is denied access to the one or more secure resources 317.

Alternately, in a final OR security policy, not all of the biometric sample templates must be authenticated 311 by the computer system, another computer system or the security token 313. If a sufficient number of biometric sample templates have been authenticated 315 to still meet the predetermined security policy, the user is allowed access to the one or more secure resources 317. If however, an insufficient number of biometric sample templates have not been authenticated 315 to meet the predetermined security policy, processing ends 319 and the user is denied access to the one or more secure resources 317.

Figure 3A:
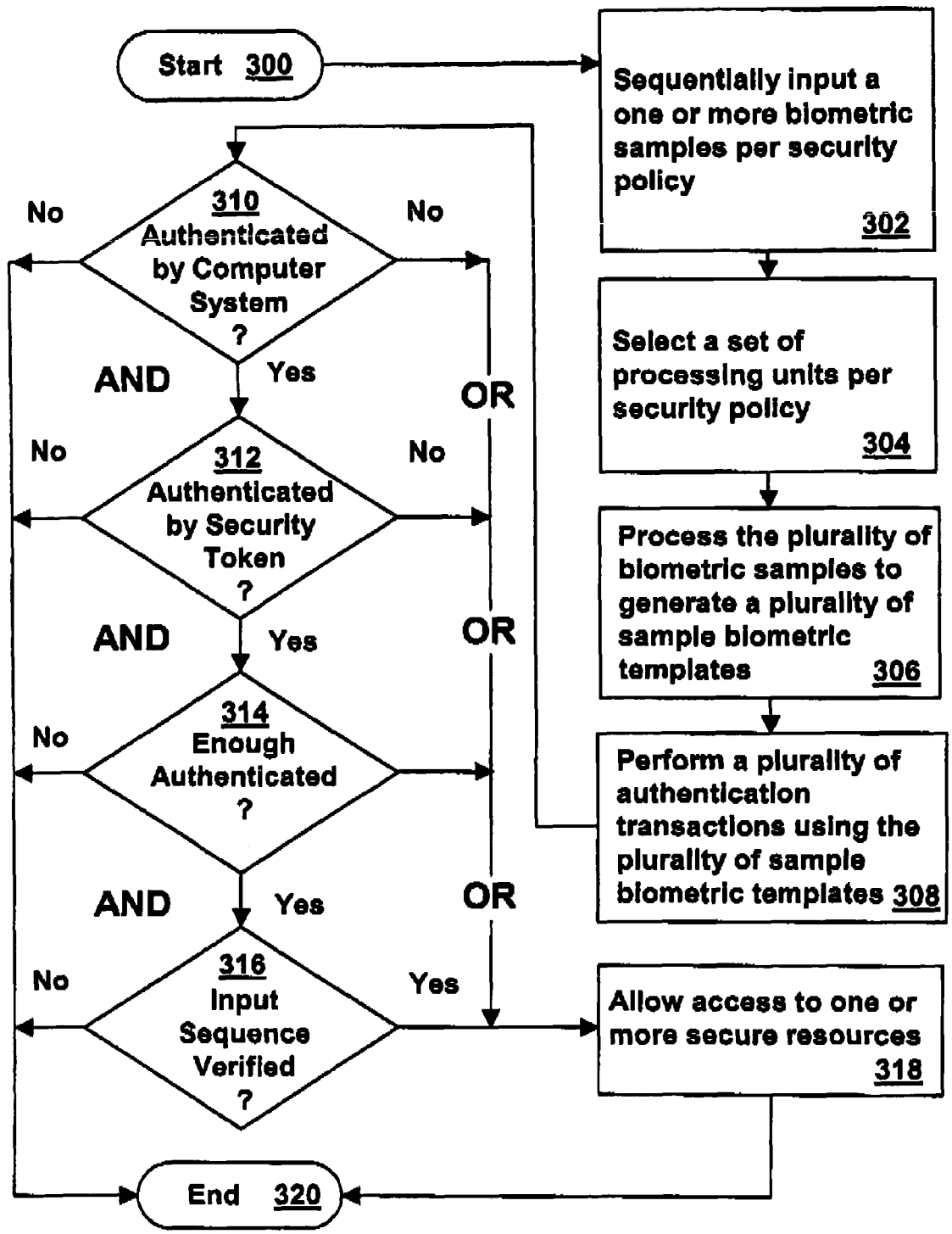
FIG. 3A—is a flow diagram illustrating the major steps associated with implementing another embodiment of the invention.

Referring to FIG. 3A, the major steps involved in implementing alternate embodiments are illustrated. The process is initiated 300 by a user sequentially inputting a plurality of biometric samples into one or more biometric scanners according to an existing security policy where the input sequence is maintained as an additional authentication requirement.

Based on the inputted biometric sample type and/or heuristically derived information, a set of processing units is selected which will generate a set of sample biometric templates according to the security policy 304. The inputted plurality of biometric samples are then processed by the selected set of processing units (computer systems, security token and/or biometric processing applications) to generate a plurality of sample biometric templates for use in a plurality of authentication transactions 306.

A plurality of authentication transactions is then performed by comparing the generated biometric sample templates with a reference set of biometric templates 308 retrieved from a biometric datastore or database. In some embodiments, the majority of biometric samples templates are authenticated by a computer system or another computer system and a subset authenticated by a security token. Depending on the applicable security policies, if one or more biometric sample templates fail to be authenticated 310 by the computer system, processing ends 320 and the user is denied access to one or more secure resources 318.

This arrangement is indicative of an AND security policy which requires all authentications to be successful. If all the biometric sample templates intended to be authenticated by the computer system are authenticated 310, the remaining unauthenticated subset of biometric sample templates is sent to the security token or another computer system for authentication 312. If any member of the subset of biometric sample templates fails authentication 312 by the security token or another computer system, processing ends 320 and the user is denied access to one or more secure resources 318. This arrangement is again indicative of the AND security policy which requires all authentications to be successful.

However, in an OR security policy, not all of the biometric sample templates must be authenticated 310 by the computer system. The failed biometric sample template(s) may be authenticated by a security token 312 or another computer system. If the security token or another computer system is unable to authenticate the failed biometric sample template(s) or the subset of the biometric sample templates, processing ends 320 and the user is denied access to the one or more secure resources 318. This arrangement is indicative of a combination OR and AND security policies which requires all authentications to be successful but not necessarily on a single processing unit.

If the security token successfully authenticates 312 the received biometric sample templates, another authentication transaction is performed to determine if a sufficient number of biometric sample templates have been authenticated to meet the predetermined security policy 314. If a sufficient number of biometric sample templates have been authenticated 314 to meet the predetermined security policy, the user is allow access to the one or more secure resources 318. If however, an insufficient number of biometric sample templates have not been authenticated 314 to meet the predetermined security policy, processing ends 320 and the user is denied access to the one or more secure resources 318.

Alternately, in another OR security policy, not all of the biometric sample templates must be authenticated 312 by the computer system or security token 314. If a sufficient number of biometric sample templates have been authenticated 314 to still meet the predetermined security policy, the user is allow access to the one or more secure resources 318. If however, an insufficient number of biometric sample templates have not been authenticated 314 to meet the predetermined security policy, processing ends 320 and the user is denied access to the one or more secure resources 318.

In another AND security policy, if all of the biometric sample templates are authenticated 310 by the computer system, the or another computer system and/or security token 314, a final authentication transaction is performed to determine if the biometric samples were entered in the proper sequence 316. If the biometric samples were entered in the proper sequence, the user is allowed access to the one or more secure resources 318. If however, the biometric sample were not entered in the proper sequence 316, processing ends 320 and the user is denied access to the one or more secure resources 318. It will be appreciated by one skilled in the art that other combinations of AND and OR security policies may be established to accomplish a particular security state or implement a particular security policy.

In a final OR security policy, if not all of the biometric sample templates are authenticated 312 by the computer system, the or another computer system and/or security token 314, a final authentication transaction is performed to determine if the biometric samples were entered in the proper sequence 316. If the biometric samples were not entered in the proper sequence, but a sufficient number have been authenticated 314 to still meet the predetermined security policy, the user is allow access to the one or more secure resources 318. If however, an insufficient number of biometric sample templates have not been authenticated 314 to meet the predetermined security policy, processing ends 320 and the user is denied access to the one or more secure resources 318.

Figure 3B:
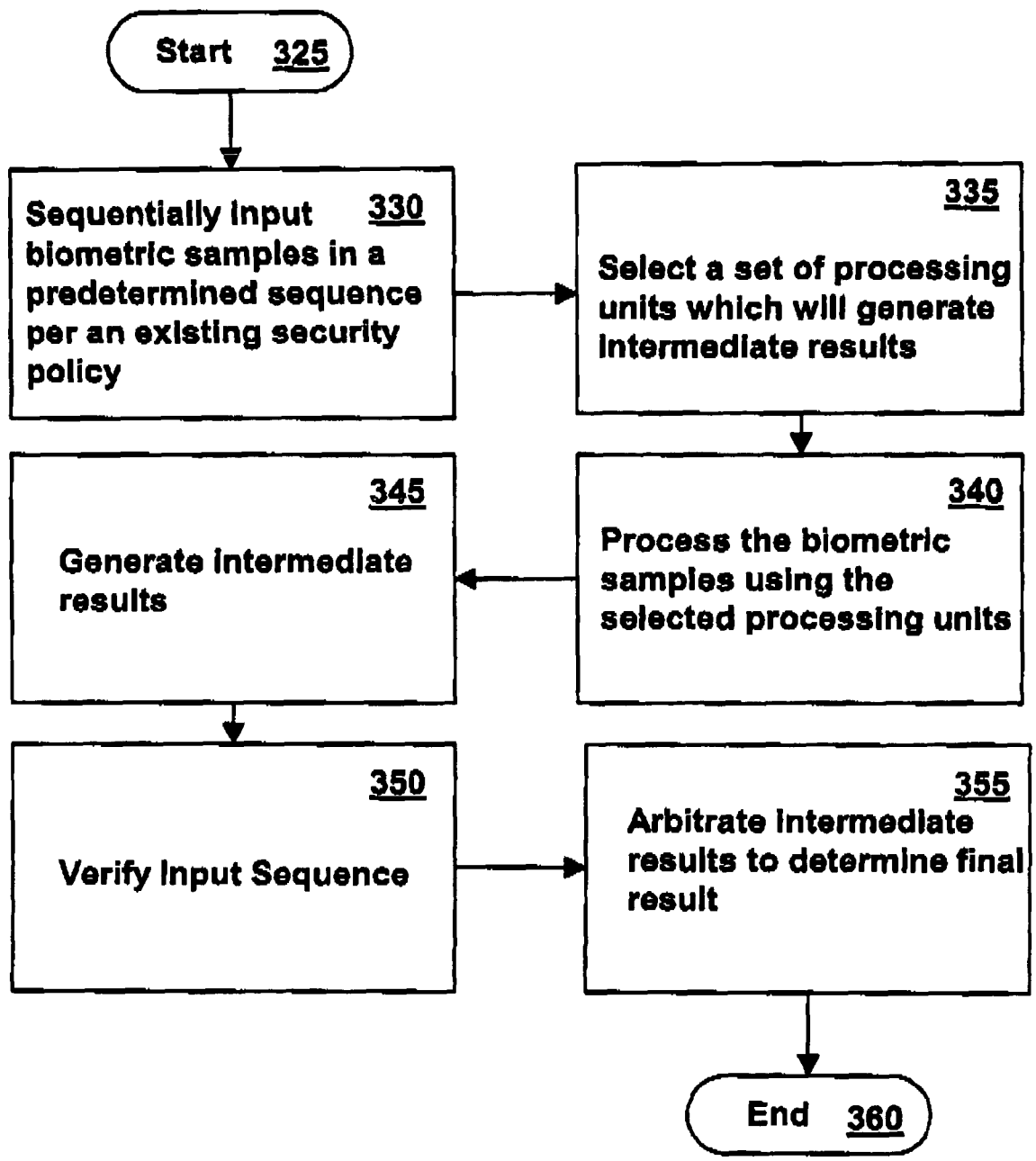
FIG. 3B—is a flow diagram illustrating the major steps associated with implementing another embodiment of the invention.

Referring to FIG. 3B, the major steps involved in other embodiments are illustrated. The process is initiated 325 by a user inputting a plurality of biometric samples into one or more biometric scanners according to an existing security policy. As before, a predetermined sequence may be required to meet a predetermined security policy 330 or required by the security policy for other reasons. Based on the inputted biometric sample type and/or heuristically derived information, a set of processing units or biometric applications is selected which will generate the intermediate results 335.

The inputted plurality of biometric samples are then processed by the selected set of processing units (computer systems, security token and/or biometric processing units) 340 to generate the intermediate results 345. The input sequence is then verified 350 if required by the existing security policy, followed by arbitration of the intermediate results to determine a final result 355 and normal processing termination 360. In one embodiment of a security token performs a portion of the processing to generate the intermediate results. In other embodiments, the security token performs the arbitration functions.

Figure 3C:
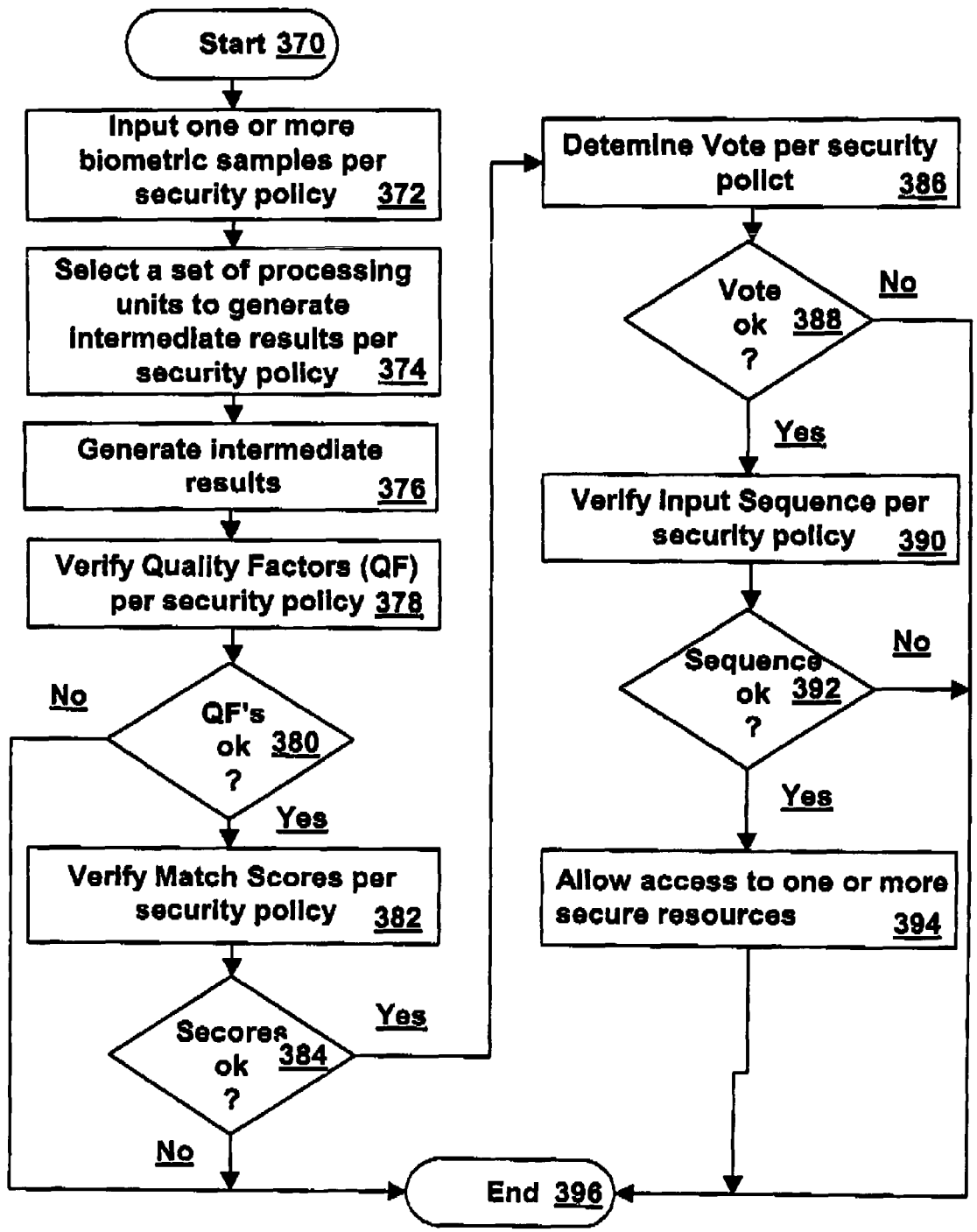
FIG. 3C—is a flow diagram illustrating the major steps associated with implementing another embodiment of the invention.

Referring to FIG. 3C, the major steps involved in implementing other embodiments are illustrated. In these embodiments, the security policy requirements may include quality factors, matching scores, ability to obtain a vote and biometric sample input sequence verification. Some or all of the security policy requirements may be provided. The process is initiated 370 by a user inputting one or more biometric samples into one or more biometric scanners according to existing security policy requirements. As before, a set of processing units is selected according to the existing security policy which will generate the intermediate results 379. The selected processing units then process the inputted biometric samples to produce the intermediate results 376. A portion of the intermediate results is verified to determine if the quality of results is sufficient to meet the existing security policy 378. If the quality of results does not meet the existing security policy requirements 380 processing ends 396. If the quality of results does meet the meet the existing security policy requirements 380 processing continues by verifying that the matching scores generated by the selected processing units meets the existing security policy requirements 382. If the generated matching scores does not meet the existing security policy requirements 384 processing ends 396.

If the generated matching scores do meet the meet the existing security policy requirements 384 processing continues by determining if a proper vote can be arbitrated according to the existing security policy requirements 386. If a proper vote cannot be made according to the existing security policy requirements 388 processing ends 396. If a proper vote can be made according to the existing security policy requirements 388 processing continues by determining if the biometric samples were inputted in the proper sequence according to the existing security policy requirements 390. If the proper biometric sample input sequence has not been entered according to the existing security policy requirements 392 processing ends 396. If the proper biometric sample input sequence has been entered according to the existing security policy requirements 392 the user is allowed access to one or more secure resources 394 followed by normal processing termination 396.

The foregoing described embodiments are provided as illustrations and descriptions. They are not intended to limit the invention to precise form described. In particular, it is contemplated that functional implementations described herein may be implemented equivalently in hardware, software, firmware, and/or other available functional components or building blocks. No specific limitation is intended to a particular security system or financial services system. Other variations and embodiments are possible in light of above teachings, and it is not intended that this Detailed Description limit the scope of the invention, but rather such scope is limited only by the claims following herein.

What is claimed is:

1. A method for providing error discrimination in a biometric authentication system, said method comprising:
   inputting from a user one or more biometric samples;
   selecting from among a plurality of available processing units, a set of processing units which will generate intermediate results from the processing of said inputted one or more biometric samples;
   processing at least a portion of said inputted one or more biometric samples by said selected set of processing units to at least provide said intermediate results; and
   arbitrating said intermediate results by a security token to generate a final result which at least meets a predetermined security policy, wherein said predetermined security policy comprises a false acceptance rate.

2. The method according to claim 1, wherein said arbitrating is performed by a plug-in module operatively installed inside said security token.

3. The method according to claim 1, wherein said selected set of processing units is selected at least in part by at least one of the following:
   (i) heuristically using either quality factors or matching scores determined from said one or more biometric samples; or
   (ii) implementation of one or more pre-established security policies.

4. The method according to claim 1, wherein said intermediate results are generated in a standardized format usable by two or more of said selected set of processing units.

5. The method according to claim 1, wherein said plurality of available processing units comprises a plurality of discrete biometric processing applications.

6. The method according to claim 1, wherein said plurality of available processing units comprises a plurality of discrete biometric processing applications, and wherein said plurality of discrete biometric processing applications are distributed among a plurality of operatively networked computer systems.

7. The method according to claim 1, wherein at least one of said selected set of processing units is an authentication server.

8. The method according to claim 1, wherein said inputting further comprises inputting said one or more biometric samples in a predetermined sequence.

9. The method according to claim 8, wherein said arbitrating further comprises verifying said predetermined sequence.

10. The method according to claim 8, wherein said predetermined sequence is a secret known to at least said user.

11. The method according to claim 8, wherein said predetermined sequence includes serial inputting, simultaneous inputting or a combination thereof.

12. The method according to claim 1, wherein said arbitrating comprises implementation of one or more logic based rules, verification that generation of said final result will be within an acceptable boundary associated with said predetermined security policy, a vote determined from said intermediate results or a combination thereof.

13. The method according to claim 1, wherein said processing is performed recursively, sequentially or a combination thereof among said selected set of processing units.

14. The method according to claim 1, wherein said plurality of biometric samples arise from similar anatomical features, dissimilar anatomical features or a combination thereof.

15. The method according to claim 1, wherein at least a portion of said predetermined security policy is maintained as a secret by at least said security token.

16. The method according to claim 1, wherein said arbitrating comprises matching at least a portion of said intermediate results to one or more reference biometric templates stored inside said security token.

17. A system for providing error discrimination in a biometric authentication system, comprising:
   at least one computer system including;
      one or more operatively coupled biometric input sections;
      an operatively coupled security token and
      a plurality of biometric processing sections that:
         receive one or more biometric samples inputted by a user via said one or more biometric input sections,
         select from among said plurality of biometric processing units, a set of biometric processing sections which will generate intermediate results from the processing of said inputted one or more of biometric samples,
         process at least a portion of said inputted one or more biometric samples by said selected set of biometric processing sections to at least provide said intermediate results, and
         arbitrate said intermediate results to generate a final result which at least meets a predetermined security policy, wherein at least a portion of said arbitrate is performed by said security token, and wherein said predetermined security policy comprises a false acceptance rate.

18. The system according to claim 17 wherein said one or more biometric samples are inputted in a predetermined sequence.

19. The system according to claim 18 wherein said set of biometric processing sections further includes a verifier that verifies said predetermined sequence.

20. The system according to claim 17 wherein the processing of said at least a portion of said one or more biometric samples is performed recursively, sequentially or a combination thereof among said set of biometric processing means.

21. The system according to claim 17, wherein said arbitrate is performed by a plug-in module operative stored inside said security token.

22. A system for reducing error rates associated with biometric verification and identification systems, comprising:
   at least one computer system including;
      a first processor;
      a security token operatively coupled to said first processor;
      one or more biometric scanners coupled to said first processor;
      a first memory operatively coupled to said first processor;
      at least one biometric processing application operatively stored in at least a portion of said first memory; said at least one biometric processing application having logical instructions executable by said first processor to:
- receive one or more biometric samples inputted by a user via said one or more biometric scanners;
- select from among a plurality of available biometric processing applications, a set of biometric processing applications which will generate intermediate results by processing said one or more biometric samples;
- cause at least a portion of said one or more biometric samples to be processed by said selected set of biometric processing applications to at least provide said intermediate results, and
- cause said intermediate results to be arbitrated by said security token into a final result; and said security token including;
- a second processor;
- a second memory;
- at least one token biometric processing application operatively stored in a portion of said second memory having logical instructions executable by said second processor to arbitrate said final result from said intermediate results in accordance with a predetermined security policy, wherein said predetermined security policy comprises a false acceptance rate; and
- said predetermined security policy operatively stored in another portion of said second memory.

23. The system according to claim 22 wherein said one or more biometric samples are inputted in a predetermined sequence.

24. The system according to claim 23 wherein said set of biometric processing applications further includes logical instructions executable by said first processor to verify said predetermined sequence.

25. The system according to claim 23 wherein said predetermined sequence is a secret known to at least said user.

26. The system according to claim 22, wherein said at least one token biometric processing application is a plug-in module.

27. A non-transitory computer readable medium storing software that is executable by at least one processor, the software including executable instructions for causing said at least one processor to:
- receive one or more biometric samples inputted by a user via one or more biometric scanners;
- select from among a plurality of available biometric processing applications, a set of biometric processing applications which will generate intermediate results by processing said one or more inputted biometric samples;
- cause at least a portion of said one or more biometric samples to be processed by said selected set of processing applications to at least provide said intermediate results, and
- cause said intermediate results to be arbitrated by another processor into a final result which at least meets a predetermined security policy, wherein said predetermined security policy comprises a false acceptance rate.

28. The non-transitory computer readable medium according to claim 27 wherein said executable instructions are stored in a code format comprising byte code, compiled, interpreted, compliable or interpretable.

29. The non-transitory computer readable medium according to claim 27, wherein said another processor is associated with a security token, and wherein said arbitrating is performed by a plug-in module operatively installed inside said security token.

* * * * *